United States Patent
Marolda et al.

Patent Number: 6,055,739
Date of Patent: May 2, 2000

[54] SYSTEM AND METHOD FOR ALIGNMENT OF STOWAGE DRUM AND CAPSTAN IN A SEAGOING VESSEL

[75] Inventors: Victor J. Marolda, Salem; Louis E. Sansone, Moosup, both of Conn.

[73] Assignee: The United States of America as represented by the Secretary of the Navy, Washington, D.C.

[21] Appl. No.: 09/114,248

[22] Filed: Jul. 6, 1998

[51] Int. Cl.[7] .................................................. G01B 11/27
[52] U.S. Cl. ................................ 33/645; 33/286; 33/533
[58] Field of Search ............................. 33/645, 286, 533, 33/613, DIG. 1

[56] References Cited

U.S. PATENT DOCUMENTS

| | | | |
|---|---|---|---|
| 3,612,700 | 10/1971 | Nelson | 33/286 |
| 3,907,435 | 9/1975 | Roodvoets | 33/286 |
| 4,681,439 | 7/1987 | Shoemaker | 33/286 |
| 5,359,781 | 11/1994 | Melville | 33/645 |

*Primary Examiner*—Christopher W. Fulton
*Attorney, Agent, or Firm*—Michael J. McGowan; Robert W. Gauthier; Prithvi C. Lall

[57] ABSTRACT

A simple and accurate stowage drum and capstan alignment system and method for the Deployable Array Work Group (DAWG) is provided. The system includes a drum reference point fixture for obtaining the drum centerline, a drum sighting assembly and a capstan sight alignment fixture. For each spoke of the drum brought to a predetermined position adjacent the drum reference point fixture, the distance between the bulkhead and the inner and outer flanges of the drum is measured and the centerline position is calculated by averaging the readings. The drum sighting assembly is positioned within the drum and aligned with the calculated centerline. The capstan sight alignment fixture is positioned on the capstan. Looking through the scope of the drum sighting assembly to the capstan sight alignment fixture, measurements are taken of the offset, roll and rotation of the capstan unit relative to the drum. Additionally, a measurement of the drive shaft/flex coupling keyway freeplay is obtained.

17 Claims, 3 Drawing Sheets

SYSTEM AND METHOD FOR ALIGNMENT OF STOWAGE DRUM AND CAPSTAN IN A SEAGOING VESSEL

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a system and method to align a drum and capstan, and more particularly to a system and method to align the stowage drum and capstan of the Deployable Array Working Group (DAWG) installed within a submarine.

(2) Description of the Prior Art

In order to attain the highest level of sonar capabilities, current submarines are outfitted with DAWG systems, allowing the deployment of arrays from the submarine. The DAWG includes a drum for stowing the array aboard the submarine and a capstan unit for deploying the array from the drum and retrieving the array onto the drum. Key to successful operation of the DAWG system is proper relative alignment of the stowage drum and capstan. The alignment is verified after submarine construction and installation of the DAWG system. Previous alignment methods utilized a photogrametry process which included placing targets about the ballast tank containing the DAWG system, obtaining accurate photographs of the targets in relation to the DAWG system and using photogrametry methods to determine the DAWG system alignment based on the target and DAWG system relationships revealed in the photos. However, the photogrametry process is time consuming, taking on the order of several weeks, and thus costly to implement. It has also been determined that the method is prone to error and less accurate than the use of standard theodolite surveying methods. However, the use of theodolites is also time consuming and expensive. Further, theodolites can only be used when the compartment housing the DAWG system is completely dry. Since this compartment is normally flooded when the submarine is waterborne and is partially flooded when the submarine is docked at a repair facility, theodolite measurement could only be used immediately after construction of the submarine. Otherwise, the equipment would have to be brought through water into the ballast tank.

Laser alignment systems are well known in the art. U.S. Pat. No. 3,923,402 to Turcotte recites a laser alignment method and apparatus for aligning paper machinery through the use of a laser reference beam. The exact position of the laser reference beam is determined relative to a pair of benchmarks utilizing triangular reflecting prisms at the benchmarks. The paper machinery can then be positioned and aligned by taking appropriate measurements off the laser reference line. U.S. Pat. No. 4,319,406 to Pehrson, Sr. et al. recites the use of a laser beam to align a series of rollers. Targets are placed on each roller and the laser beam is directed along the desired alignment line such that when the rollers are properly aligned, the laser passes through each target. Starting with the roller nearest the laser, the position of the laser on the target is noted and the proper alignment adjustment is made to allow the laser beam to pass through the target. Each roller is then aligned in turn until the laser beam passes through all the targets. As with a theodolite measurement method, the use of lasers is not practical in an environment where the equipment must be transported under water.

SUMMARY OF THE INVENTION

Accordingly, it is an object of the present invention to provide an accurate stowage drum and capstan alignment system.

Another object of the present invention is to provide an inexpensive stowage drum and capstan alignment system.

A further object of the present invention stowage drum and capstan alignment system which can be users normally flooded compartment of a seagoing vessel.

Still another object of the present invention is to provide a stowage drum and alignment system which can be used in a partially flooded compartment at a pier or at a ship repair facility.

Other objects and advantages of the present invention will become more obvious hereinafter in the specification and drawings.

In accordance with the present invention, a simple and accurate system and method of aligning the stowage drum and capstan of the Deployable Array Work Group (DAWG) is provided. The system includes a drum reference point fixture, a drum sighting assembly and a capstan sight alignment fixture. The drum reference point fixture consists of a scale mounted perpendicularly to a centerline bulkhead adjacent the drum and is utilized in obtaining the drum centerline. For each spoke of the drum brought to a predetermined position adjacent the scale, the distance between the bulkhead and the inner and outer flanges of the drum is measured. The centerline position is calculated by averaging the inner and outer flange readings. The drum sighting assembly is positioned within the drum and aligned with the calculated centerline. The capstan sight alignment fixture is positioned on the capstan. Looking through the scope of the drum sighting assembly to the capstan sight alignment fixture, measurements are taken of the offset, roll and tilt of the capstan unit relative to the drum. Adjustments can then be made to align the drum and capstan according to the measurements taken. When tested after submarine construction against theodolite measurements, the system and method proved to be as accurate as the theodolite measurements. The system consists of simple scales, frames and a sighting telescope easily mounted within the DAWG compartment. Divers can be used to bring the equipment into the ballast tank, install the equipment and take measurements when the compartment is partially flooded or when the submarine is pierside.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
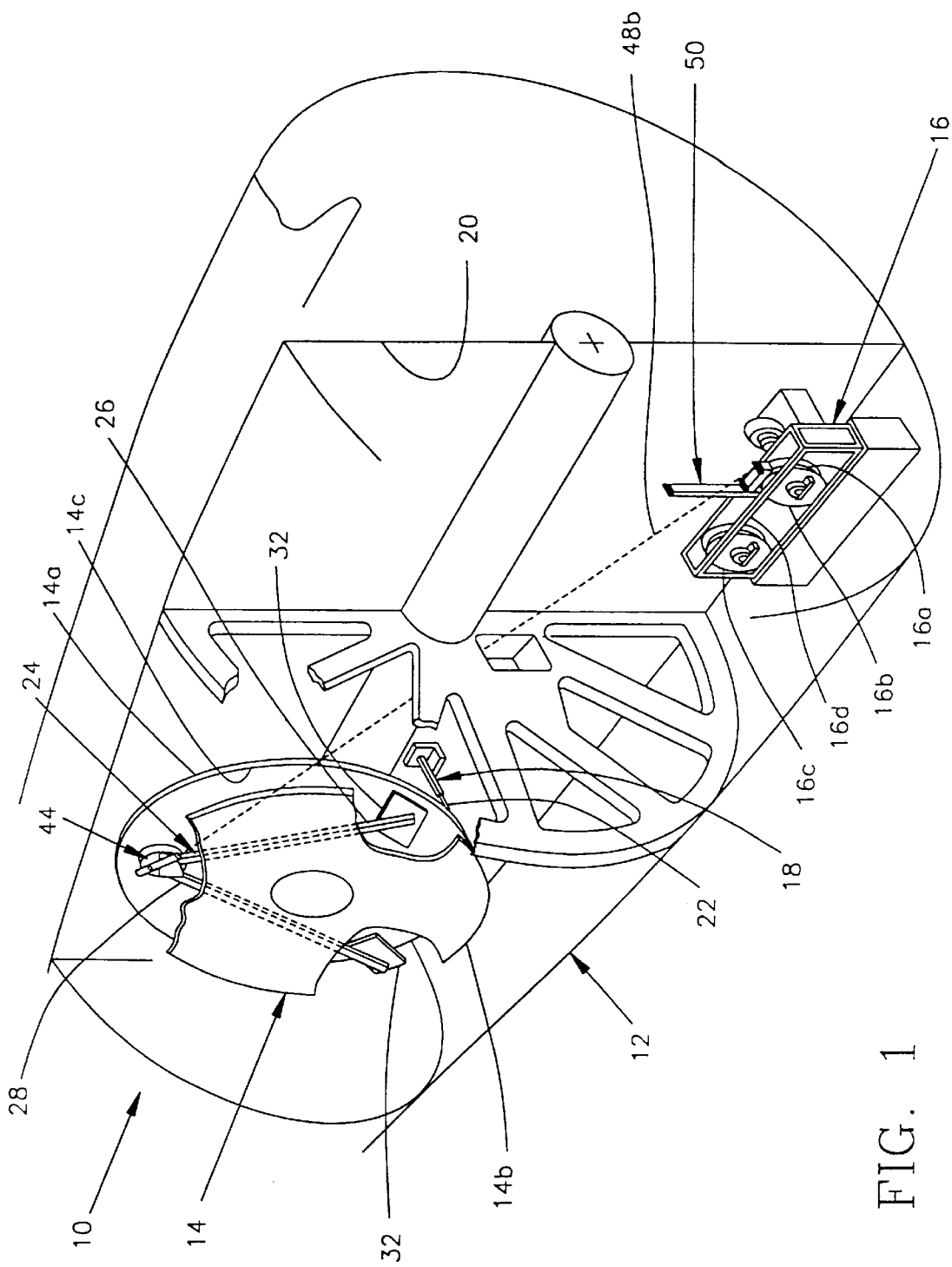
FIG. 1 is a perspective representation of the system of the present invention in use within a submarine compartment.

Referring now to FIG. 1, there is shown a perspective representation of alignment system 10 installed within a submarine compartment 12. System 10 is used to align drum 14 and capstan 16 for proper deployment of an array (not shown) from compartment 12. The array is typically stored on drum 14 and deployed through capstan 16, thus alignment of drum 14 and capstan 16 is critical. System 10 includes a drum reference point fixture 18 securely attached to bulkhead 20 which forms one wall of compartment 12. Drum reference point fixture 18 is attached to bulkhead 20 such that scale 22 of drum reference point fixture 18 is perpendicular to bulkhead 20 and extends adjacent to both flanges 14a and 14b of drum 14. FIG. 1 shows flange 14b, furthest away from bulkhead 12, in partial cross section so as to illustrate the features of system 10. With scale 22 in place, drum 14 is rotated through 45° increments and distance measurements along scale 22 are taken for each flange 14a and 14b at each increment. The location of drum 14 centerline can then be calculated by averaging these measurements. Scale 22 is marked with the calculated drum 14 centerline (CDC). With the centerline established, drum sighting assembly 24 can be installed within drum 14.

Figure 2:
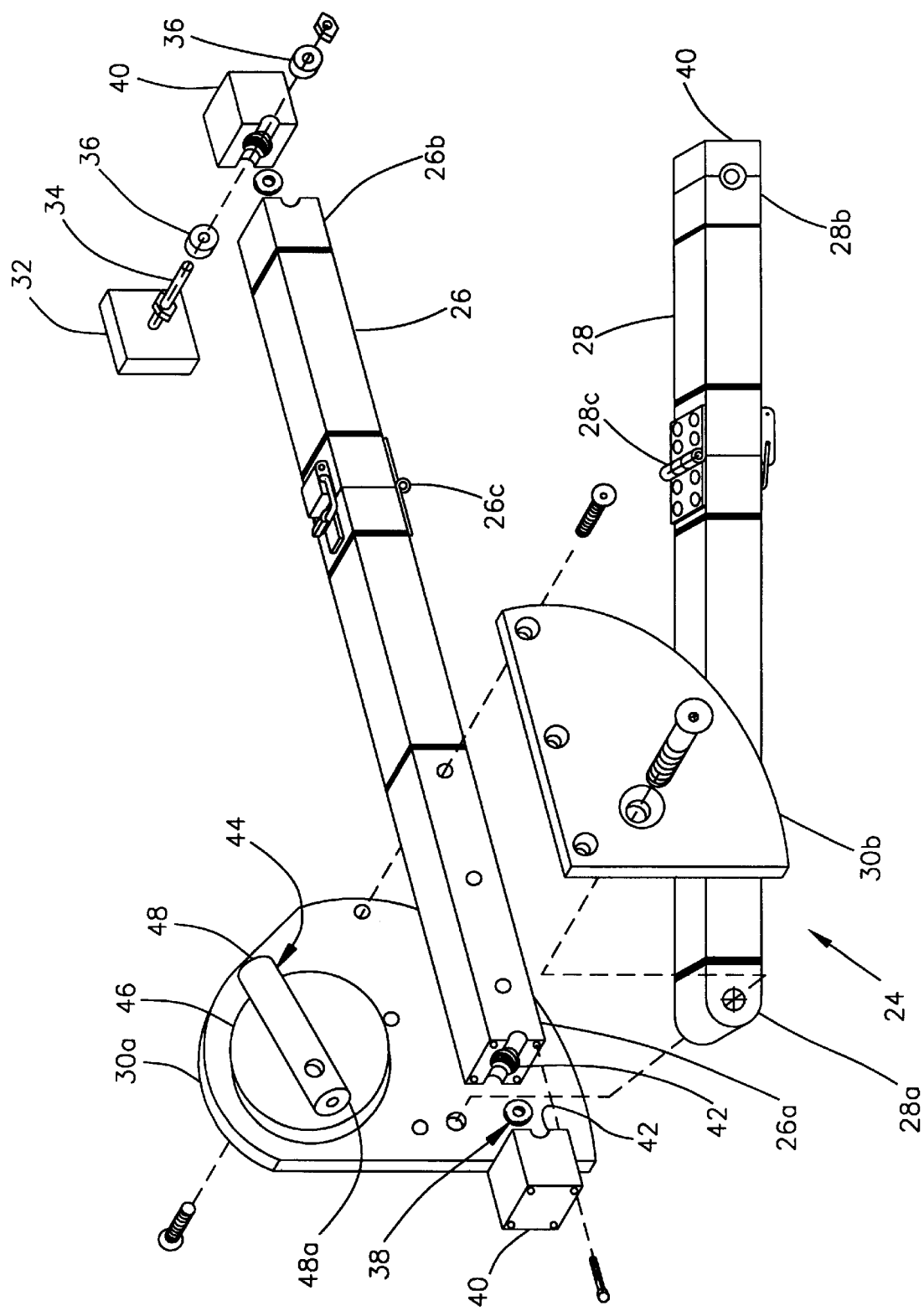
FIG. 2 is an isometric exploded view of the drum sighting assembly.

Referring now also to FIG. 2, drum sighting assembly 24 has a forward leg 26 and a rear leg 28. Forward leg 26 is secured between inboard holding plate 30a and outboard holding plate 30b, with first end 26a protruding past plates 30a and 30b. Rear leg 28 is rotatably connected at first end 28a between plates 30a and 30b. Assembly 24 is attached between flanges 14a and 14b by three magnetic bases 32, one base 32 being at each of the second ends 26b and 28b of legs 26 and 28, respectively, and one base being at first end 26a of leg 26. The bases magnetically adhere to the interior surface 14c of the chosen flange. Bolt 34 is threaded into each base 32, each bolt 34 having opposed stops 36 adjustable along the length of bolt 34. Bolts 34 pass through gimbals 38 at ends 26a, 26b and 28b with opposed stops 36 to either side of legs 26 and 28. Covers 40 bolt into leg ends 26a, 26b and 28b, holding gimbals 38 within corresponding depressions 42 in covers 40 and leg ends 26a, 26b and 28b. The gimbal connections allow for slight misalignments of the magnetic bases 32, and the stops 36 allow assembly 24 to be adjusted to lie at the centerline of drum 14 as will be explained further. Telescope assembly 44 is attached to inboard plate 30a via mounting plate 46 with sight 48 rotatably attached to mounting plate 46. Sight 48 mounting is such that sight 48 lies in the same plane as gimbals 38.

With bases 32 magnetically adhered to flange inner surface 14c in a triangular pattern, assembly 24 is mounted to bases 32 as described above. The position of bases 32 and legs 26 and 28 are adjusted such that there is no interference with drum 14, any array cable remaining on drum 14, or any adjacent support structures. Sight 48 is pointed to the center of drum 14 and drum 14 is rotated such that eye piece 48a of sight 48 is positioned adjacent scale 22. Using stops 36 at end 26a adjacent sight 48, eye piece 48a is adjusted to the drum 14 centerline reference mark CDC. The drum is rotated such that end 26b is adjacent scale 22. Sight 48 is pointed down leg 26 and stops 36 at end 26b are adjusted until the sight 48 cross hairs align with drum 14 centerline reference mark CDC. The process is then repeated with leg 28. The positions can be verified by again rotating drum 14 such that eye piece 48a is adjacent scale 22, repeating the adjustments if necessary. Drum 14 is then rotated until sight 14 can be sighted down forward leg 26, along array path 48b to capstan 16.

Figure 3:
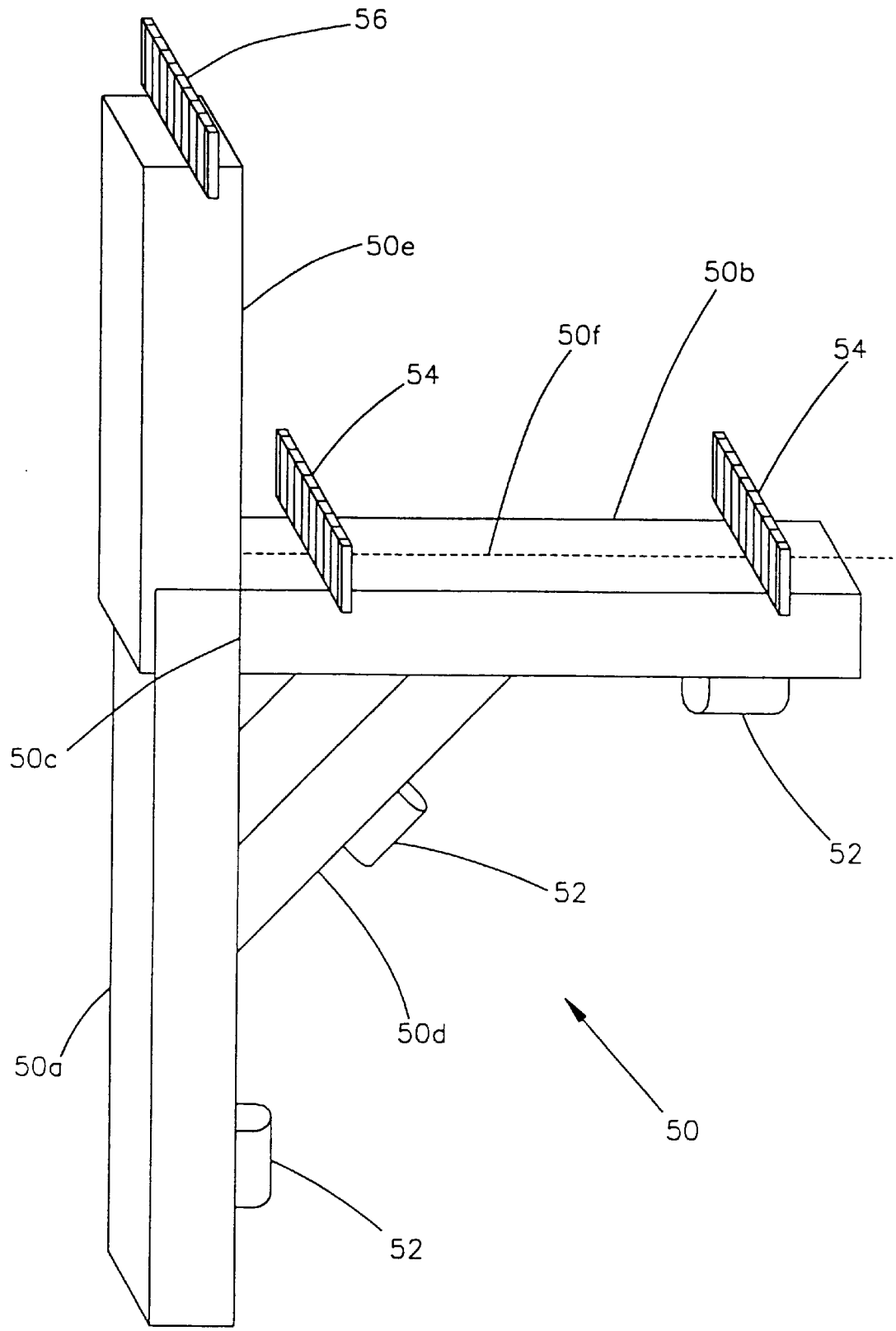
FIG. 3 is a side view of the capstan sight alignment fixture.

Referring now additionally to FIG. 3, capstan sight alignment fixture 50 has vertical leg 50a and horizontal leg 50b attached end to end to form a 90° angle at joint 50c. Three groove retainers 52 are attached to fixture 50, one to each leg end distant from joint 50c and one at connecting member 50d which forms a 45° angle with both legs 50a and 50b at joint 50c. A third leg 50e can be bolted to vertical leg 50a, extending in the same direction as vertical leg 50a such that fully assembled fixture 50 is generally T-shaped. With third leg 50e removed, groove retainers 52 are positioned so as to rest within inboard groove 16a of forward capstan wheel 16b. This is accomplished by placing vertical leg 50a vertically between forward capstan wheel 16b and rear capstan wheel 16c, and horizontal leg 50b over forward capstan wheel 16b. Fixture 50 is adjusted to align horizontal leg 50b parallel to horizontal members 16d of capstan 16. It can be seen that groove retainers 52 are attached to legs 50a and 50b and connecting member 50d so as to lie along the radius of forward capstan wheel 16b. Scales 54 are placed on horizontal leg 50b transverse to the axis of forward capstan wheel 16b, aligning similar gradations on each scale 54 with centerline 50f scribed onto horizontal leg 50a. Scales 54 are placed at locations generally corresponding to the projection onto horizontal leg 50b of the points of contact of groove retainers 52 and forward capstan wheel 16b.

Looking through sight 48 to scale 54 corresponding to groove retainer over forward capstan wheel 16b, the offset between drum 14 and capstan 16 is obtained directly, i.e., the amount capstan 16 is offset from the plane of drum 14. Looking to scale 54 corresponding to groove retainer 54 on vertical leg 50a, the capstan roll can be obtained, i.e., the angle between the plane of drum 14 and the plane of capstan 16. While maintaining fixture 50 in place, third leg 50e is attached with third scale 56 placed in its end remote from joint 50c and transverse to the axis of capstan 16. Looking to scale 56 through sight 48, the capstan tilt can be obtained, i.e., the angle the plane of the capstan makes with the vertical. If the measurements taken are denoted "A" for the offset measurement, "B" for the roll measurement and "C" for the tilt measurement, it can be seen that:

$$\text{Roll} = \arctan[(B-C)/c_1]; \text{ and} \quad (1)$$

$$\text{Tilt} = \arctan[(A-B)/c_2], \quad (2)$$

with $c_1$ denoting the actual distance between scales on horizontal leg 50b and $c_2$ denoting the actual distance between scale 54 corresponding to groove retainer on leg 50a and scale 56.

The invention thus described provides a simple and accurate method for determining the alignment of the drum and capstan units of the DAWG. Relatively simple components are required to implement the method, including a drum reference point fixture for obtaining the drum centerline, a drum sighting assembly and a capstan sight alignment fixture. For each spoke of the drum brought to a predetermined position adjacent the drum reference point fixture, the distance between the bulkhead and the inner and outer flanges of the drum is measured and the centerline position is calculated by averaging the readings. The drum sighting assembly is positioned within the drum and aligned with the calculated centerline. The assembly consists of two legs, having one of their ends rotatably secured to each other at a joint with a sight mounted near the joint. Three magnetic bases adhere to the drum flange with the free end of each leg attached to one base and the third base attached at the rotating joint. The attachments to the bases allow adjustment of the distance between the flange of the drum and the legs and sight so as to align them with the drum centerline. The capstan sight alignment fixture is positioned on the capstan. This fixture fits over the forward capstan wheel and has three scales, two scales aligned in the vertical plane of the capstan and one of those scales and the third scale aligned in a vertical plane orthogonal to the vertical plane of the capstan. Looking through the scope of the drum sighting assembly to the scales of the capstan sight alignment fixture, measurements are taken of the offset, roll and rotation of the capstan unit relative to the drum. The components of the system are lightweight and compact and can easily be brought into the ballast tank of a submarine, even when the ballast tank is partially flooded and the equipment must be transported underwater. Referring once again to the preferred embodiment of FIG. 2, legs 26 and 28 are provided with hinged joints 26c and 28c, respectively, allowing easier transport of the system. The equipment and method are easy to use with only minimal training needed to set up the instruments and perform the measurements. The simplicity of the equipment and the method of installing and making the alignment measurements makes the system and method very cost effective and repeatable.

Although the present invention has been described relative to a specific embodiment thereof, it is not so limited. For example, the magnetic bases may be replaced with bases which clamp or bolt to the drum flange. Any type of adjustable joint can be used to attach the alignment assembly legs to the bases, or the bases themselves can be adjustably attached to the flange, e.g., the bases may be integral with the legs and use adjustable bolts to attach to the drum flange. Any configuration of the alignment assembly which allows the scope to be accurately positioned at the drum centerline may be used. It may be possible to eliminate one or both legs, only providing adjustable sighting points within the drum to verify alignment with the drum centerline. The capstan sight alignment fixture can also be attached to the capstan in any manner that provides scales in the orthogonal vertical planes, e.g., the scales could extend from one or more fixtures bolted to the side of the capstan structure.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A drum and capstan alignment measurement system comprising:
    a sight alignment assembly affixed within a centerline rotational plane of the drum;
    a capstan sight fixture affixed to the capstan;
    a first set of measurement scales affixed to the capstan sight fixture and lying in a first generally vertical rotational plane of the capstan, a line of sight between the sight alignment assembly and the first set of measurement scales providing a measure of an offset distance between the drum and capstan in a direction generally perpendicular to the rotational plane of the drum and further providing a measure of an angle between the rotational plane of the drum and the first generally vertical rotational plane of the capstan; and
    a second set of measurement scales affixed to the capstan sight fixture and lying in a second generally vertical plane orthogonal to the first generally vertical rotational plane, a line of sight between the sight alignment assembly and the second set of measurement scales providing a measure of the angle between a generally horizontal plane orthogonal to the rotational plane of the drum and the second generally vertical plane.

2. The system of claim 1 further comprising a drum reference fixture, the centerline rotational plane being located by averaging a series of measurements from the drum to the drum reference fixture, the series of measurements taken as the drum is rotated.

3. The system of claim 1 wherein the sight alignment assembly further comprises a rotatable scope providing the line of sight between the sight alignment assembly and the first and second set of measurement scales.

4. The system of claim 3 wherein the sight alignment assembly further comprises:
    a forward leg; and
    a rear leg rotatably connected to the forward leg at a central joint, the rotatable scope further affixed at the central joint.

5. The system of claim 4 wherein the sight alignment assembly further comprises a plurality of bases adjustably affixing the legs and joint to the drum, adjustment of the bases serving to align the sight alignment assembly within the centerline rotational plane.

6. The system of claim 5 wherein the bases are magnetically attached to a flange of the drum, the flange being in a plane generally parallel to the centerline rotational plane.

7. The system of claim 5 wherein the sight alignment assembly further comprises:
    a plurality of bolts corresponding to the plurality of bases, each one of the plurality of bolts affixed to one of the plurality of bases, the bolts extending from the bases generally perpendicular to the centerline rotational plane;
    a plurality of gimbaled joints corresponding to the plurality of bases, at least one gimbaled joint located at free ends of the legs remote from the central joint, at least one gimbaled joint located at the central joint, each bolt passing through one of the gimbaled joints, the gimbaled joints allowing limited rotation of the legs about an axis lying within the centerline rotational plane; and
    at least one stop adjustable along the length of each bolt, the at least one stop holding the gimbaled joint at a fixed distance from the corresponding base to position the sight alignment assembly within the centerline rotational plane.

8. The system of claim 1 wherein the capstan sight fixture further comprises:
    a first member extending generally horizontally adjacent the capstan, the first set of measurement scales affixed in a spaced apart relationship along the first member; and
    a second member affixed perpendicularly to the first member forming a right angle in the first generally vertical rotational plane of the capstan, the second set of measurement scales affixed in a spaced apart relationship along the second member.

9. The system of claim 8 wherein the second member further comprises a section removable from the second member to provide the line of sight between the sight alignment assembly and the first set of measurement scales.

10. The system of claim 8 wherein the capstan sight fixture further comprises a plurality of retainers, the retainers fitting within a groove on a wheel of the capstan to align the capstan sight fixture within the first generally vertical rotational plane of the capstan.

11. The system of claim 10 wherein the sight alignment assembly further comprises a rotatable scope providing the line of sight between the sight alignment assembly and the first and second set of measurement scales.

12. The system of claim 11 wherein the sight alignment assembly further comprises:

a forward leg; and a rear leg rotatably connected to the forward leg at a central joint, the rotatable scope further affixed at the central joint.

13. The system of claim 12 wherein the sight alignment assembly further comprises a plurality of bases adjustably affixing the legs and joint to the drum, adjustment of the bases serving to align the sight alignment assembly within the centerline rotational plane.

14. The system of claim 13 wherein the bases are magnetically attached to a flange of the drum, the flange being in a plane generally parallel to the centerline rotational plane.

15. The system of claim 14 wherein the sight alignment assembly further comprises:

a plurality of bolts corresponding to the plurality of bases, each one of the plurality of bolts affixed to one of the plurality of bases, the bolts extending from the bases generally perpendicular to the centerline rotational plane;

a plurality of gimbaled joints corresponding to the plurality of bases, at least one gimbaled joint located at free ends of the legs remote from the central joint, at least one gimbaled joint located at the central joint, each bolt passing through one of the gimbaled joints, the gimbaled joints allowing limited rotation of the legs about an axis lying within the centerline rotational plane; and at least one stop adjustable along the length of each bolt, the at least one stop holding the gimbaled joint at a fixed distance from the corresponding base to position the sight alignment assembly within the centerline rotational plane.

16. A method for determining the alignment of a drum and capstan, the method comprising the steps of:

determining the location of a centerline rotational plane of the drum;

establishing a line of sight within the centerline rotational plane in the general direction of the capstan;

arranging a first pair of measurement scales in a first generally vertical rotational plane of the capstan, the first pair having a first separation distance between scales;

sighting along the line of sight to obtain first scale readings on the first pair of measurement scales, the first scale readings corresponding to an offset distance between the centerline rotational plane and the first generally vertical rotational plane along a rotational axis of the capstan;

determining a first difference between the first scale readings, the first difference corresponding to an angle between the rotational plane of the drum and the first generally vertical rotational plane of the capstan when divided by the first separation distance;

arranging a second pair of measurement scales in a second generally vertical plane orthogonal to the first generally vertical rotational plane, the second pair having a second separation distance between scales;

sighting along the line of sight to obtain second scale readings on the second pair of measurement scales; and determining a second difference between the second scale readings, the second difference corresponding to an angle between a generally horizontal plane orthogonal to the rotational plane of the drum and the second generally vertical plane when divided by the second separation distance.

17. The method of claim 16 wherein the centerline rotational plane determining step further comprises the steps of:

arranging a drum reference fixture adjacent inner and outer flanges of the drum, the flanges being generally parallel with the centerline rotational plane of the drum and located to either side of the centerline rotational plane, the drum reference fixture being generally perpendicular to the flanges;

recording a series of reference measurements of the location of each flange along the reference fixture as the drum is rotated through a full rotation, each reference measurement corresponding to equal partial rotations of the drum; and averaging the recorded reference measurements, the average measurement corresponding to the location of the centerline rotational plane along the reference fixture.

* * * * *